US009075823B2

(12) United States Patent
Teguh et al.

(10) Patent No.: US 9,075,823 B2
(45) Date of Patent: Jul. 7, 2015

(54) METHOD AND SYSTEM OF SHARING A BROADCAST PRESET TABLE BETWEEN A VEHICLE TUNER AND AN EXTERNAL DEVICE

(71) Applicants: Chris Teguh, Torrance, CA (US); Melvin Diaz, Torrance, CA (US)

(72) Inventors: Chris Teguh, Torrance, CA (US); Melvin Diaz, Torrance, CA (US)

(73) Assignee: Alpine Electronics Inc., Tokyo (JP)

( * ) Notice: Subject to any disclaimer, the term of this patent is extended or adjusted under 35 U.S.C. 154(b) by 0 days.

(21) Appl. No.: 13/828,156

(22) Filed: Mar. 14, 2013

(65) Prior Publication Data
US 2014/0278042 A1 Sep. 18, 2014

(51) Int. Cl.
G06F 17/30 (2006.01)

(52) U.S. Cl.
CPC .............. G06F 17/30241 (2013.01)

(58) Field of Classification Search
CPC ....... H04H 60/51; H04H 60/41; H04H 60/43; H04H 60/44; H04H 60/46; H04H 60/49; H04M 1/72522; H03J 1/0075; H03J 2200/12
USPC ................ 701/300; 455/185.1, 166.2, 179.1, 455/186.1, 456.3; 707/621
See application file for complete search history.

(56) References Cited

U.S. PATENT DOCUMENTS

| 7,054,601 B2 * | 5/2006 | Heiderscheit et al. ...... 455/179.1 |
| 8,165,546 B2 * | 4/2012 | Ingrassia et al. ........... 455/185.1 |
| 2010/0285763 A1 * | 11/2010 | Ingrassia et al. ........... 455/185.1 |
| 2011/0207423 A1 * | 8/2011 | Tarte .......................... 455/186.1 |
| 2012/0272145 A1 | 10/2012 | Ryan et al. |
| 2014/0163780 A1 * | 6/2014 | Chen et al. ........................ 701/2 |

* cited by examiner

Primary Examiner — Marthe Marc-Coleman
(74) Attorney, Agent, or Firm — Muramatsu & Associates

(57) ABSTRACT

A method of sharing a preset table between a vehicle infotainment system including a vehicle tuner, memory for storing a first preset table and a broadcast signal receiver that receives a broadcast signal based on the first preset table, and an external device coupled to the vehicle infotainment system, includes storing the first preset table in the memory, the first preset table including first regional information and at least one combination of first station identification information and a first tuning frequency corresponding to the first station identification information, receiving a second preset table from the external device, the second preset table including second regional information and at least one combination of second station identification information and a second tuning frequency corresponding to the second station identification information, comparing the first preset table with the second preset table, and making the first preset table and the second preset table identical, if the first preset table and the second preset table are different.

21 Claims, 12 Drawing Sheets

METHOD AND SYSTEM OF SHARING A BROADCAST PRESET TABLE BETWEEN A VEHICLE TUNER AND AN EXTERNAL DEVICE

BACKGROUND

1. Field

The present disclosure relates to a method and system of sharing a broadcast preset table between a vehicle tuner and an external device. More specifically, embodiments in the present disclosure relate to a method and system of sharing a broadcast preset table from the external device such as a smartphone which has a preset table of signals available from internet and broadcast to a vehicle tuner in a car infotainment system which has a preset table of signals available from broadcast.

2. Description of the Related Art

Typically, a system for processing audio and visual signals has been a mobile or stationary electronic device such as a radio or television (TV) set which receives an audio or video on a radio or TV signal, respectively.

In case of internet radio, a considerable number of local broadcast stations are available on the internet radio and/or TV streaming, as well as some stations exclusively for internet. On the other hand, in a typical vehicle infotainment system, both, analog audio broadcasting signals and digital audio broadcasting signals are available for audio. For example, an analog audio broadcasting signal may be an amplitude-modulated (AM) audio broadcasting signal or a frequency-modulated (FM) audio broadcasting signal, whereas, a digital audio broadcasting signal may be derived from digital audio technologies like DRM (Digital Radio Mondiale), DMB Audio (Digital Multimedia Broadcasting) or HD Radio (trademark of Ibiquity), etc.

The broadcasting signals are provided by one or more external information providers, such as a radio and/or an internet provider which provides, both, analog audio broadcasting signals and digital audio broadcasting signals with corresponding audio information. In other words, the same or corresponding audio information (e.g. the same program or channel) is transmitted through each of the analog audio broadcasting signals, the digital audio broadcasting signals, and internet in parallel, wherein the analog audio broadcasting signals are received by a receiver for receiving analog audio broadcasting signals, whereas the digital audio broadcasting signals are received by a receiver for receiving digital audio broadcasting signals.

Recently, in case of mobile electronic devices, in addition to a vehicle infotainment system, a smartphone has been a very popular device which can receive information from the internet. Because corresponding audio information (e.g. the same program or channel) is available on both of the vehicle infotainment system and the smartphone, one of the analog, digital audio broadcasting signals or internet may be used for providing audio content to the user for the corresponding audio information.

When a person drives a vehicle, the person tends to bring in one's smartphone to the vehicle, and each of the vehicle infotainment system and the smart phone in the vehicle respectively contains own preset settings. From a user's viewpoint, to set a preset table for each device, with considerable corresponding preset stations which may carry the corresponding signals is cumbersome. Also, by manually setting each preset table, it is difficult to have most preset stations stored in one preset table reflected on the other preset table, thus these two preset tables may not correspond to each other to a reasonable degree. In addition, a preset order of one table may be different from the preset order of the other table. This difference may cause inconvenience to the user because the operation of choosing a station from any of the preset table is less intuitive due to the difference.

Accordingly, there is a need to provide a method and system that allows a user to easily set a preset table for both the smartphone and the vehicle infotainment system without duplicate procedures, in order to provide seamless user interface across the vehicle infotainment system and the smartphone.

Also, a user may wish to define a set of local broadcast stations as a preset table for the vehicle infotainment system, off the vehicle without driving. Furthermore, the user may wish to share the manual preset setting with others using various methods on the internet (e.g. Social Network Systems, email, etc.). Here, if the preset table obtained or shared is irrelevant to an area where the vehicle is in operation, it is not useful for reception of the broadcast signals. To share the preset table useful for the vehicle tuner, information regarding a region and or area of the preset table in view of a current position of the vehicle may need to be considered.

SUMMARY

In one aspect, a method of sharing a preset table between a vehicle infotainment system and an external device is provided. The vehicle infotainment system includes a vehicle tuner, memory for storing a first preset table and a broadcast signal receiver configured to receive a broadcast signal based on the first preset table. The external device is configured to couple to the vehicle tuner. This method includes storing the first preset table in the memory of the vehicle tuner. The first preset table includes first regional information and at least one combination of first station identification information and a first tuning frequency corresponding to the first station identification information. This method also includes receiving a second preset table from the external device. The second preset table includes second regional information and at least one combination of a second station identification information and a second tuning frequency corresponding to the second station identification information. This method further includes comparing the first preset table with the second preset table. This method also includes making the first preset table and the second preset table identical, if the first preset table and the second preset table are different.

In another aspect, a vehicle infotainment system is provided. The vehicle infotainment system includes a communication interface which is configured to couple to an external device. The vehicle infotainment system also includes a table memory manager that includes memory. The table memory manager stores a first preset table containing first regional information and at least one set of a first station identification information and a first tuning frequency corresponding to the first station identification information. The vehicle infotainment system also includes a broadcast signal receiver that receives a broadcast signal based on the first preset table. In this vehicle infotainment system, the communication interface receives a second preset table from the external device, where the second preset table contains the second regional information and at least one set of a second station identification information and a second tuning frequency corresponding to the second station identification information from the external device. The table memory manager compares the first preset table with the second preset table received from the external device, and makes the first preset table and the second preset table identical, if the first preset table and the second preset table are different.

In one embodiment, a first preset table of a vehicle infotainment system and a second preset table of an external device are made identical by copying the second preset table to the first preset table.

In one embodiment, a first preset table of a vehicle infotainment system and a second preset table of an external device are made identical by comparing times when these two preset tables are updated. The vehicle infotainment system stores a first time stamp indicating when the first preset table is edited. Then the vehicle infotainment system receives a second time stamp indicating when the second preset table is edited from the external device. The first time stamp with the second time stamp are compared, and the second preset table is copied to the first preset table, if the second time stamp is newer than the first time stamp.

In one embodiment, the external device is able to connect to a server coupled to an internet, and the method further includes communicating the second preset table with the server. In this method, the external device is able to download a preset table from the server, and to upload the second preset table to the server.

In one embodiment, the vehicle infotainment system detects a vehicle position by a vehicle positioning module either inside or at proximity of the vehicle tuner. The vehicle infotainment system determines whether the vehicle position is within a coverage of an area designated by the first regional information in the first preset table. If it is determined that the first location is outside of the coverage of the area designated by the first regional information, the second preset table is copied to the first preset table.

In one embodiment, a vehicle infotainment system receives a broadcast signal of a current station by a vehicle tuner in the vehicle infotainment system. The vehicle infotainment system estimates first regional information of a first preset table from data on the broadcast signal, if the current station is in the first preset table.

In one embodiment, a method includes detecting a second location of an external device by a device positioning module either inside or at proximity of the external device, wherein the second regional information is associated with the second location.

In one embodiment, whether a second preset table of an external device includes second station identification information without its corresponding tuning frequency is determined, in order to see if any station is available only online, not from broadcast signals. If such a station exists, the second station identification information without its corresponding tuning frequency is excluded from the second preset table.

In one embodiment, a first preset table of a vehicle infotainment system includes a first preference profile containing a first set of preference by a user and a second preset table of an external device includes a second preference profile containing a second set of preference. A preset sharing method in this embodiment further includes selecting a second preset table in the external device based on similarity of the first preference profile and the second preference profile.

The above and other aspects, objects and advantages may best be understood from the following detailed discussion of the embodiments.

DETAILED DESCRIPTION OF THE PREFERRED EMBODIMENTS

Various embodiments for the method and system of sharing a broadcast preset table between a vehicle tuner and an external device will be described hereinafter with reference to the accompanying drawings. Unless defined otherwise, all technical and scientific terms used herein have the same meaning as commonly understood to one of ordinary skill in the art to which present disclosure belongs. Although the description will be made mainly for the case where the method and system of sharing a broadcast preset table between a vehicle tuner and an external device, such as a smartphone, any methods, devices and materials similar or equivalent to those described, can be used in the practice or testing of the embodiments. All publications mentioned are incorporated by reference for the purpose of describing and disclosing, for example, the designs and methodologies that are described in the publications which might be used in connection with the presently described embodiments. The publications listed or discussed above, below and throughout the text are provided solely for their disclosure prior to the filing date of the present disclosure. Nothing herein is to be construed as an admission that the inventors are not entitled to antedate such disclosure by virtue of prior publications.

In general, various embodiments of the present disclosure are related to a method and system of sharing a broadcast preset table between a vehicle tuner and an external device. Furthermore, the embodiments are related to a method of coupling to a server coupled to internet, the method further comprising uploading the second preset table to the server. Thus, a user can easily share the broadcast preset table across the internet.

Figure 1:
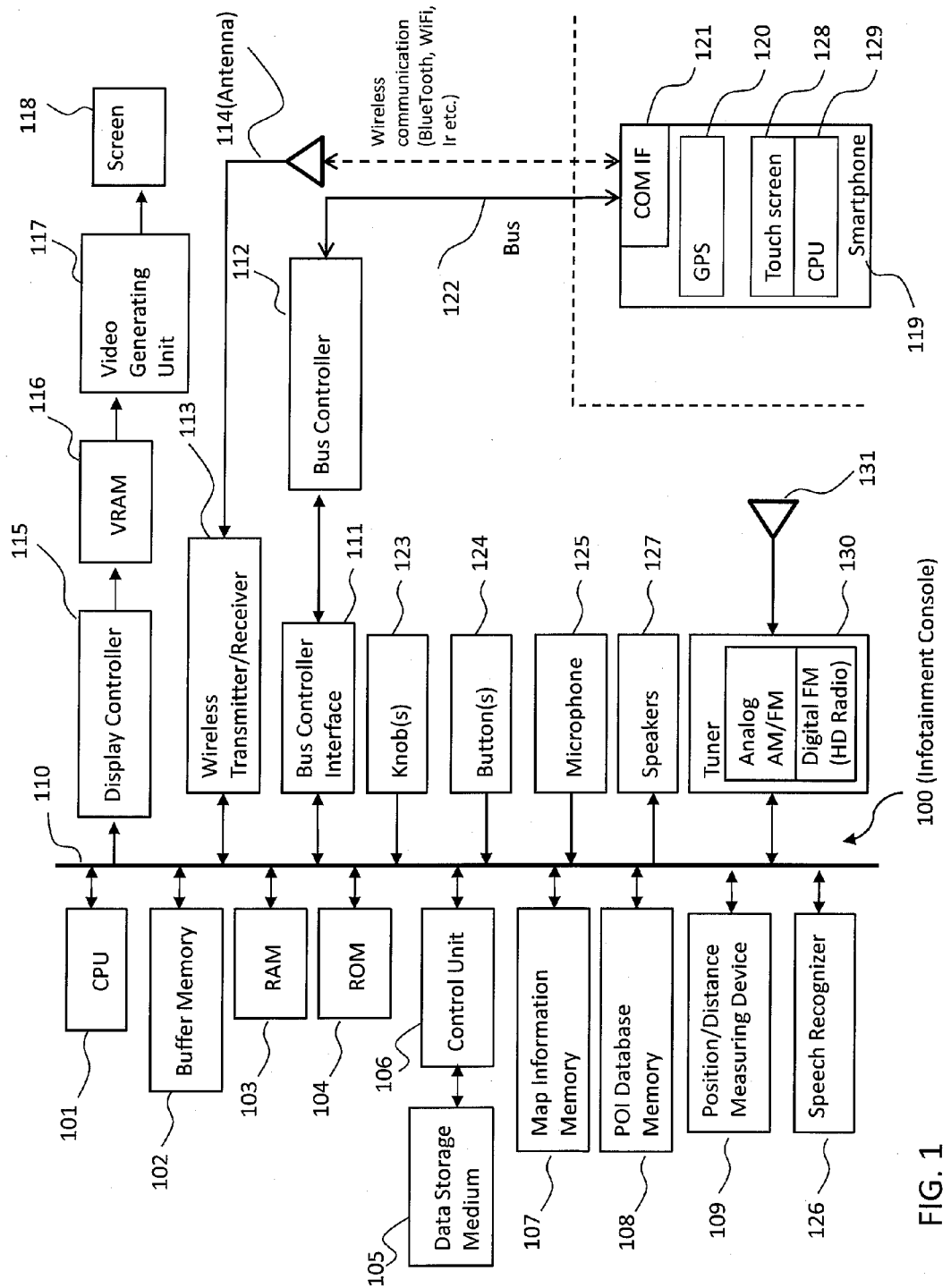
FIG. 1 is a block diagram of an infotainment console in a vehicle and a smartphone according to one embodiment.

FIG. 1 is a block diagram of an infotainment console in a vehicle and a smartphone that executes a method and system of sharing a broadcast preset table between a vehicle tuner and an external device according to one embodiment. Note that the block diagram in FIG. 1 is merely an example according to one embodiment for an illustration purpose and not intended to represent any on particular architectural arrangement. The various embodiments can be applied to other type of vehicle infotainment system implemented by vehicle head unit. For example, the vehicle infotainment console 100 includes a central processor unit (CPU) 101 for controlling an overall operation of the infotainment console, a buffer memory 102 for temporally storing data such as a preset table data for efficient handling of the preset table in accordance with this disclosure, random access memory (RAM) 103 for storing a processing result, and read only memory (ROM) 104 for storing various control programs, such as a radio tuning program and an audio visual media control program, necessary for infotainment control as well as a preset table handling of this disclosure.

The infotainment console 100 also includes a data storage medium 105 such as a hard disk in a hard disk drive (HDD), flash memory in a solid state drive (SSD) or universal serial bus (USB) key memory, a compact disc-read only memory (CD-ROM), a digital versatile disc (DVD) or other storage medium for storing entertainment contents such as music, video etc. The infotainment console also includes a control unit 106 for controlling an operation for reading the information from the data storage medium 105. The infotainment console 100 may include or have access to a position/distance measuring device 109 in a vehicle and either inside or at proximity of the infotainment console 100, for measuring a present vehicle position or user position, which may be associated with a preset table. For example, the position measuring device 109 has a vehicle speed sensor for detecting a moving distance, a gyroscope for detecting moving direction, a microprocessor for calculating a position, a global positioning system (GPS) received for receiving and analyzing GPS signals, etc. and each connected by a bus system 110.

The infotainment console 100 further includes a map information memory 107 for storing a portion of the map data relevant to ongoing operations of the infotainment console 100 which is read from the data storage medium 105, a point of interest (POI) database memory 108 for storing database information such as POI information which is read out from the data storage medium 105.

The infotainment console 100 accommodates a plurality of means for receiving user inputs. For example, the infotainment console 100 may include a bus controller 112 externally for coupling to an external device via a bus 122 (e.g. Universal Serial Bus, etc.) and a bus controller interface 111 handles received data from the external device. In one embodiment, the bus 122 may be used for receiving a preset table from a smartphone 119 that stores one or more preset tables based on radio/TV mobile applications.

Furthermore, the infotainment console 100 may include a wireless transmitter/receiver 113. Using the wireless transmitter/receiver 113 via antenna 114, the infotainment console 100 may communicate with external devices inside the vehicle, external devices surrounding vehicles, remote servers and networks, etc. In this embodiment, the wireless transmitter/receiver 113 may be used for receiving a preset table from a smartphone 119 that stores one or more preset tables based on radio/TV mobile applications.

A smartphone 119 may include a positioning device 120 such as a GPS, gyroscope, etc., a communication interface 121 that handles wired/wireless communication with the infotainment console 100 via the bus 122 and/or the wireless transmitter/receiver 113, a touch screen 128 which receives touch entries of a user, and a central processing unit (CPU) 129 which processes the entries from the user. A smartphone 119 is one example of an external device to be paired with the infotainment console 100 for sharing a preset table, and the infotainment console 100 may receive the preset table from various other input devices, to achieve the same and similar operations done through the smartphone 119.

For example, the infotainment console 100 may include a screen 118, which may present a natural view as an interface to a user. This may be, but not limited to, a touch screen for detecting a touch entry by the user. Alternatively, as seen in a traditional vehicle entertainment system, knobs 122 and buttons 123 may be included in the infotainment console 100. To accommodate hands-free input operation to avoid driver distraction, it may be appropriate to use voice commands as user inputs for the infotainment console 100. To accommodate such voice commands, a microphone 124 for receiving speech input may be included. Once a voice command is received at the microphone 124, the voice command is sent to a speech recognizer 125 to be matched with any speech pattern associated with infotainment related vocabulary in a speech database and the matched speech pattern is interpreted as a voice command input from the user.

The vehicle infotainment console 100 may also include a plurality of means to output an interactive result of user input operations. For example, the infotainment console 100 may include a display controller 115 for generating images, such as tuning preset table images, as well as menu related images related to the infotainment console control information and some of these generated images may be stored in a video RAM (VRAM) 116. The images stored in the VRAM 116 are sent to a video generating unit 117 where the images are converted to an appropriate format to be displayed on a screen 119 of a touch screen 118. Upon the receipt of video data, the screen 119 displays the image. Alternatively, to keep eyes of a driving user on a road rather than prompting the driving user to look in to the screen, the interactive output may be presented to the driving user as audio feedback via one or more speakers 127.

The vehicle infotainment console 100 may also include a tuner 130. The tuner may include an analog AM/FM tuner, Digital FM tuner that can handle HD radio (trademark of Ibiquity), another TV tuner-decoder, etc., for receiving audio and/or video signals broadcasted. Received audio signal is processed and may be presented to the driving user via one or more speaker 127. The video signal may be presented via the screen 118 after processed by the display controller 115, VRAM 116, video generating unit 117, etc.

The bus system 110 may include one or more busses connected to each other through various adapters, controllers, connectors, etc. and the devices and units of the infotainment console 100 mentioned the above may be coupled to each other via the bus system 110.

The CPU 101 controls an overall operation of the infotainment console 100 including receiving entries of a user, processing the entries, displaying interaction to the user accordingly, selecting content from either a medium, a connected device, or a broadcast signal and presenting the content to the user. While handling the entries of the user, especially when the user needs access to the broadcast signal, the infotainment console 100 loads a preset table and displaying of the preset table by instructing the display controller 115 to display the preset table.

Figure 2A:
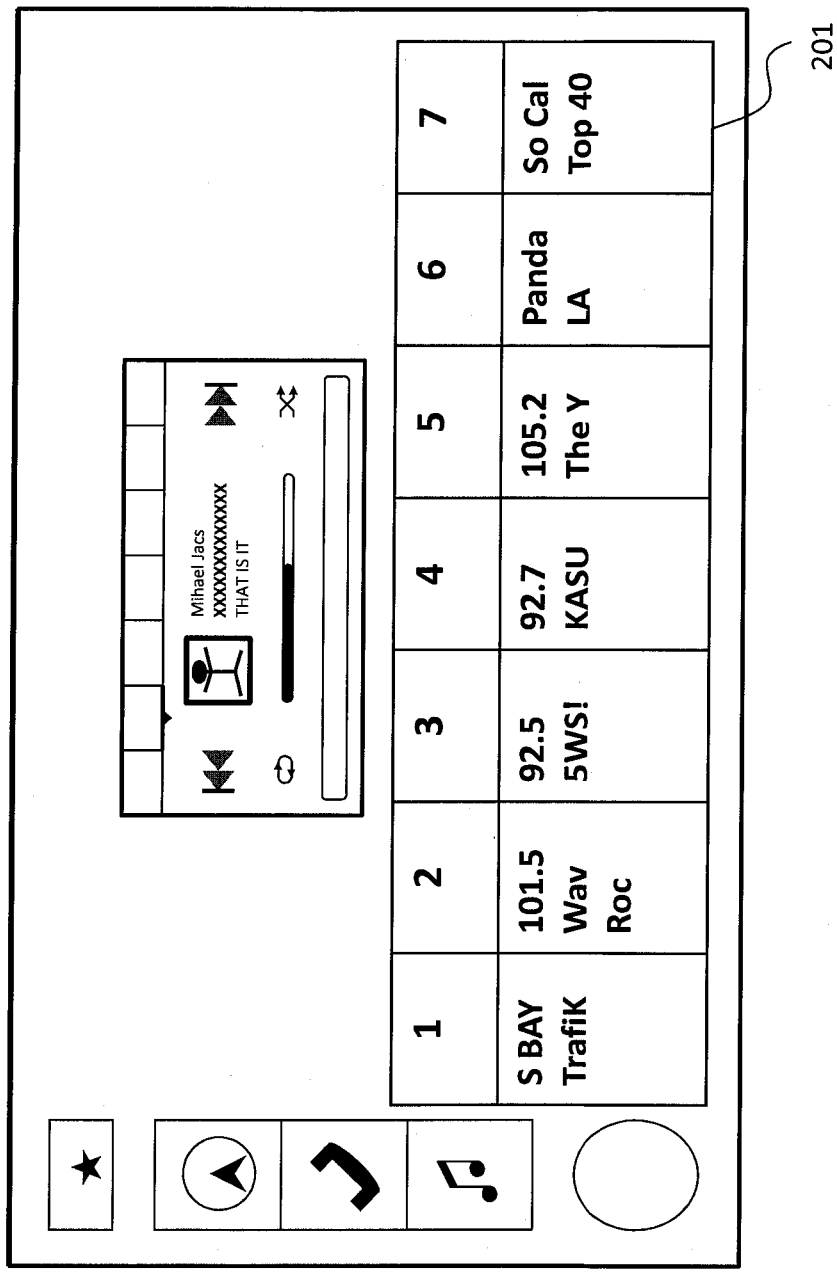
FIG. 2A shows a screen example of a shared radio station preset table of a vehicle infotainment console, according to one embodiment.
Figure 2B:
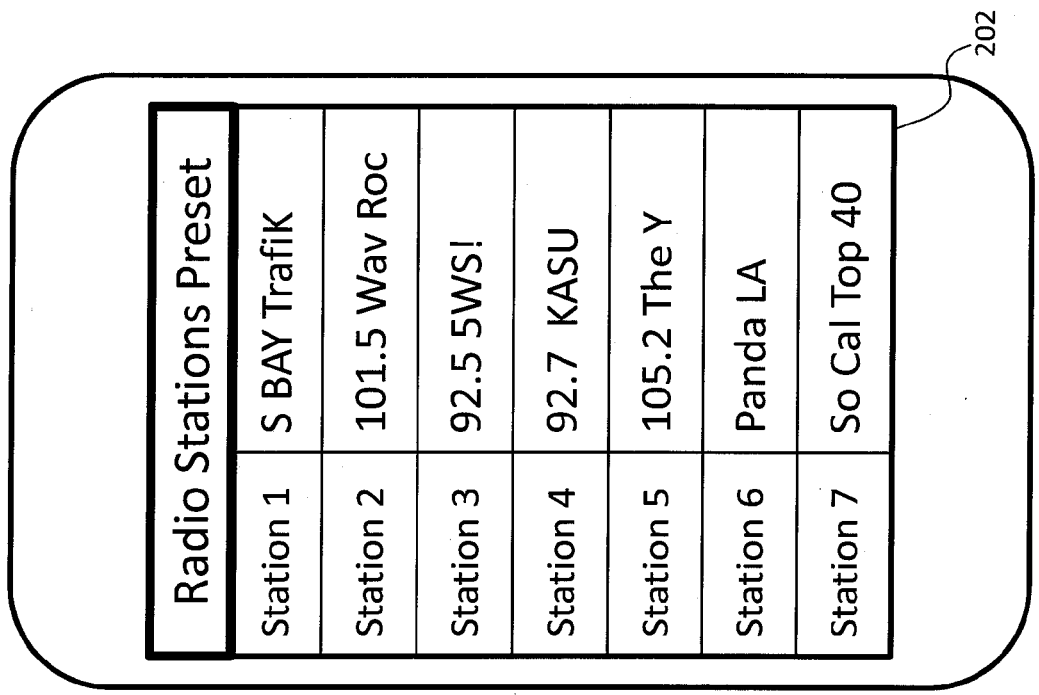
FIG. 2B shows a screen example of a shared radio station preset table of a smartphone according to one embodiment.

According to one embodiment, the CPU 101 handles storing a preset table in the tuner 130 for the infotainment console 100 in memory, such as, but it is not limited to, the buffer memory 102. Shown in FIG. 2A is one example of the preset table 201 which is imaginary generated for a Southern California region. The preset table 201 includes one or more combinations of station identification information and a tuning frequency corresponding to the station identification information. The preset table may also include a regional information (not shown) associated with the one or more stations associated with the one or more combinations of the station identification information and the tuning, frequency. The CPU 101 also handles receiving another preset table from the external device, such as the smartphone 119, paired to the infotainment console 100. As shown in FIG. 2B, the preset table 202 from the smartphone 119 includes one or more combinations of station identification information for the smartphone and a tuning frequency, if available, corresponding to the station identification information for the smartphone. The preset table for the smartphone may also include another regional information (not shown) associated with the one or more stations associated with the one or more combinations of the station identification information and the tuning frequency for the smartphone. After receiving the preset table for the smartphone from the smartphone 119, the CPU 101 compares the preset table for the infotainment console 100 with the preset table for the smartphone. If these two preset tables are different and not corresponding with each other, the CPU 101 executes operations to make these two preset tables identical.

Figure 2C:
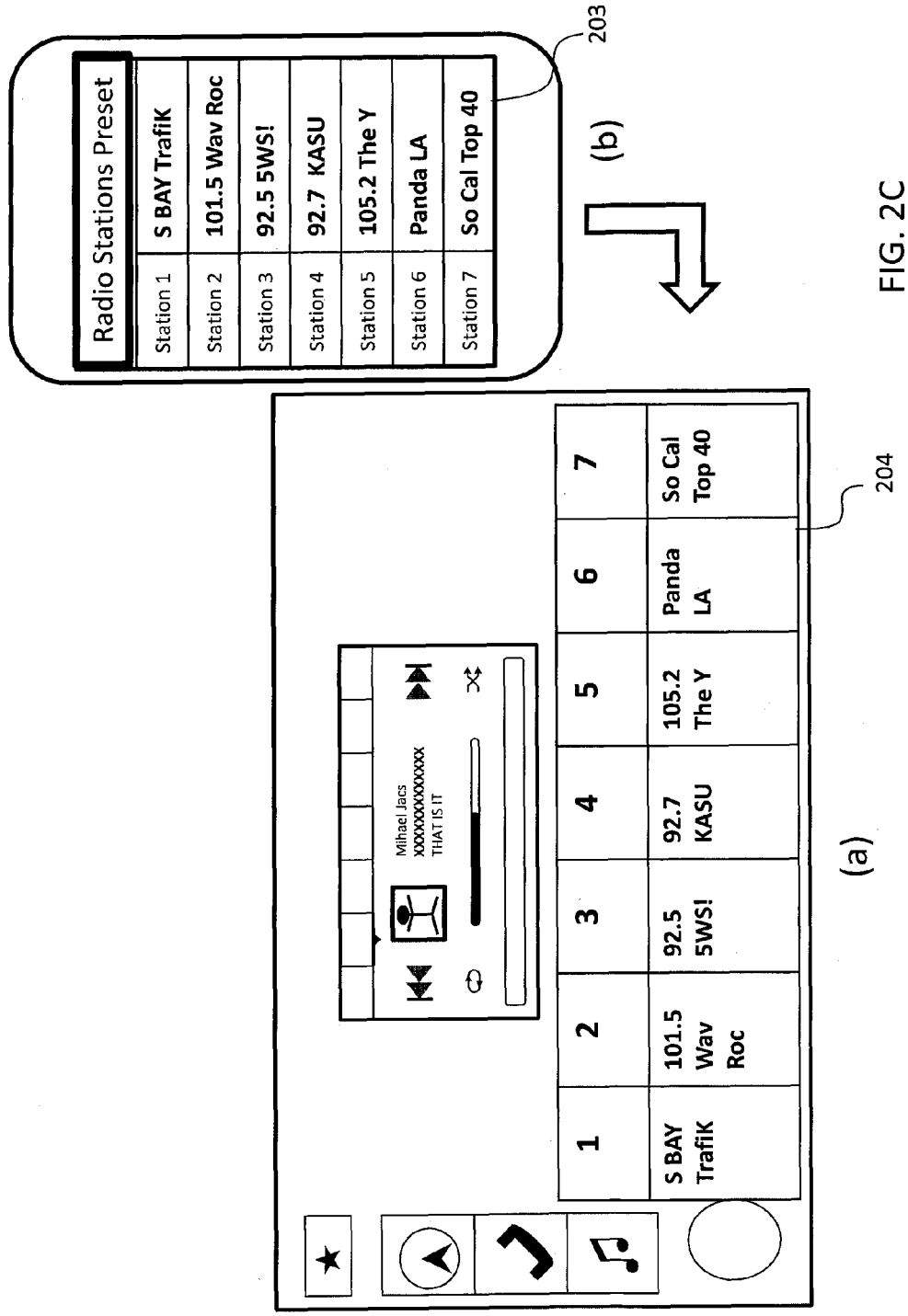
FIG. 2C shows screen examples of a shared radio station preset table across a smartphone and an infotainment console in a vehicle.
Figure 3:
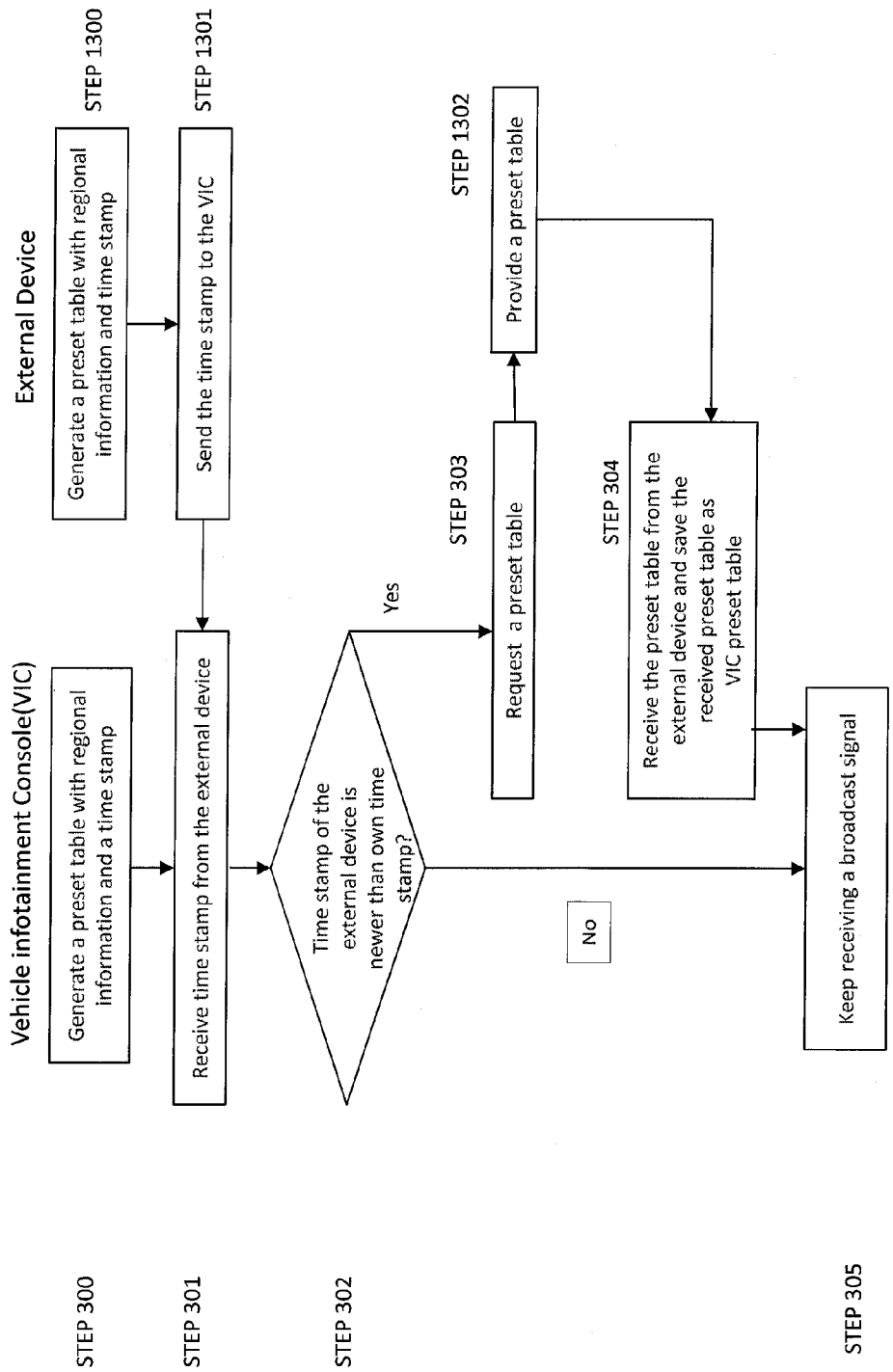
FIG. 3 is a communication flow chart of copying of a preset table in an external device to a vehicle information console, according to one embodiment.

In one embodiment as shown in FIG. 2C, the CPU 101 may copy the preset table for the smartphone 203 from the smartphone to the preset table for the infotainment console 204 in order to make these two preset tables identical. In one embodiment, As shown in FIG. 3, the CPU 101 may store a time stamp indicating when the preset table for the infotainment console is edited (Step 300). Similarly, the smartphone 119 may store a time stamp indicating when the preset table for the smartphone is edited (Step 1300). For example, each of these preset tables may include a time stamp indicating when each preset table is edited. Alternatively, each time stamp can be stored separately from each preset table. When the smartphone 119 sends the time stamp indicating when the preset table for the smartphone is edited (Step 1301), the infotainment console 100 receives the time stamp of the preset table for the smartphone from the smartphone 119 via the wireless transmitter/receiver 113 or the bus 122 (Step 301). The CPU 101 compares a time stamp of the preset table for the infotainment console and the time stamp of the preset table for the smartphone (Step 302). If the time stamp of the preset table for the smartphone is newer than the time stamp of the preset table for the infotainment console, the infotainment console 100 may determine to further receive the preset table for the smartphone and request as such to the smartphone 119, and once the smartphone 119 sends its preset table to the infotainment console 100 (Step 1302), the CPU 101 to store the received preset table as the preset table for the infotainment console (Step 304). Thus, an updated version of preset table in the smartphone 119 becomes available for the infotainment console 100, while preventing from overwriting an old preset table on the preset table for the infotainment console 100.

For further receiving the preset table for the smartphone from the smartphone, the infotainment console 100 may send a command or instruction to the smartphone 119 requesting the smartphone 119 to send the preset table for the smartphone to the infotainment console 100 (Step 303). Alternatively, the smart phone 119 may send the preset table for the smartphone together with its corresponding time stamp to the infotainment console 100, when a new edit updating the preset table for the smartphone occurs.

Figure 4:
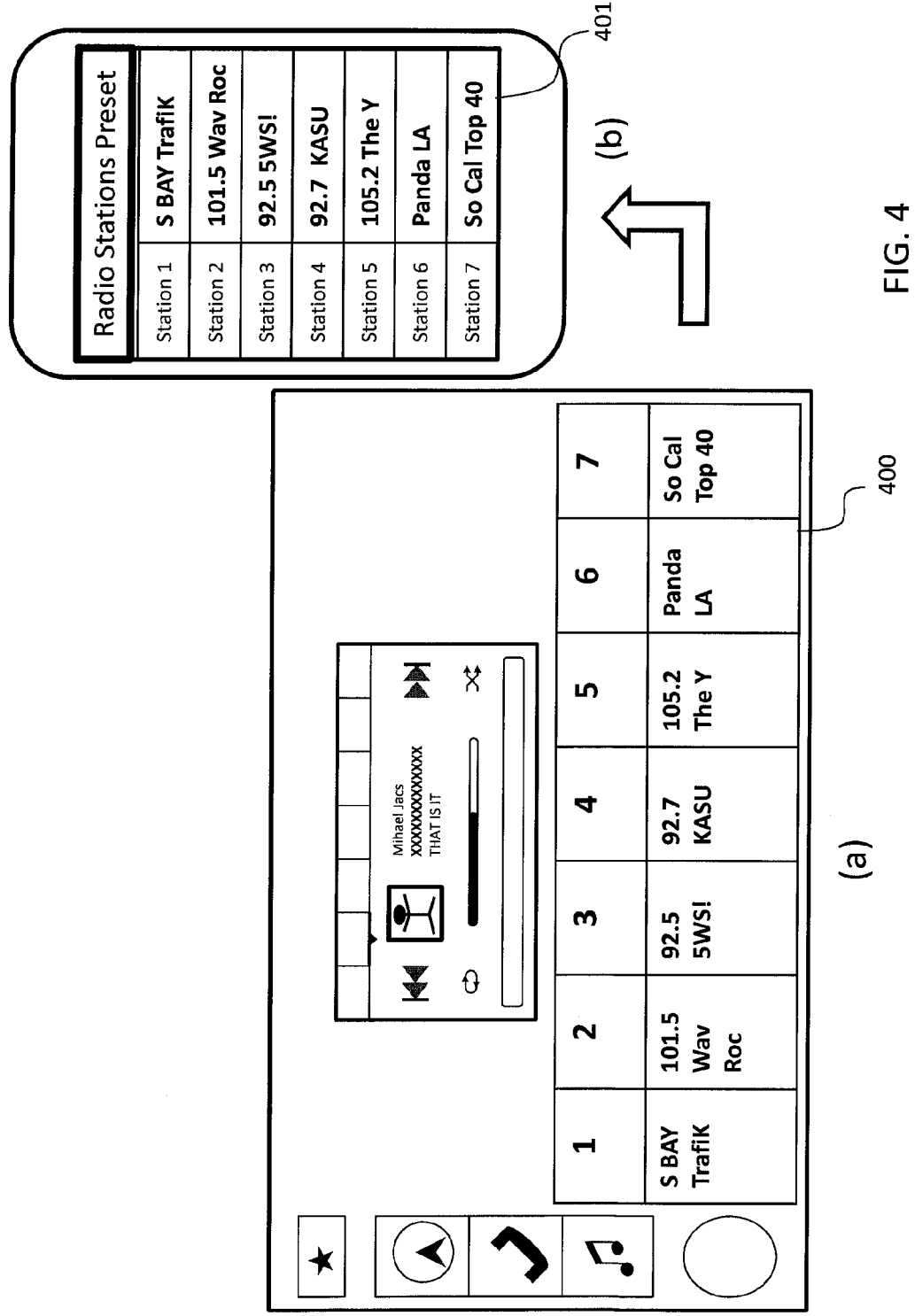
FIG. 4 shows screen examples of a shared radio station preset table across a smartphone and an infotainment console in a vehicle.

In another embodiment, as shown in FIG. 4, the CPU 101 may transmit the preset table for the infotainment console 400 to the preset table for the smartphone 401 for copying in order to make these two preset tables identical. In one embodiment, the CPU 101 stores a time stamp indicating when the preset table for the infotainment console is edited and the smartphone 119 stores a time stamp indicating when the preset table for the smartphone is edited. For example, each of these preset tables may include a time stamp indicating when each preset table is edited. Alternatively, each time stamp can be stored separately from each preset table. The infotainment console 100 and the smart phone 119 exchanges the time stamps of each preset table via the wireless transmission or the bus 122. When either the CPU 101 and/or the smartphone 119 compares the time stamps of the preset tables, and if the time stamp of the preset table for the infotainment console is newer than the time stamp of the preset table for the smartphone, the smartphone may determine to further receive the preset table for the infotainment console and to store the received preset table as the preset table for the smartphone. Thus, by copying an updated version of preset table in the infotainment console 100 to the smartphone 119 as the preset table for the smartphone, the updated version of preset table in the infotainment console 100 becomes also available for the smartphone 119, while preventing from overwriting an old preset table in the infotainment console 100 on the preset table for the smartphone 119.

For further transmitting the preset table from the infotainment console 100 to the smartphone 119, the infotainment console 100 may send a command or instruction to the smartphone 119 requesting the smartphone 119 to receive the preset table for the smartphone from the infotainment console 100. Alternatively, the smartphone 119 may send a command or instruction to infotainment console 100 requesting the infotainment console 100 to send the preset table for the infotainment console from the infotainment console 100. Alternatively, the smartphone 119 may receive the preset table together with its corresponding time stamp from the infotainment console 100, when a new edit updating the preset table for the infotainment console occurs.

Figure 5:
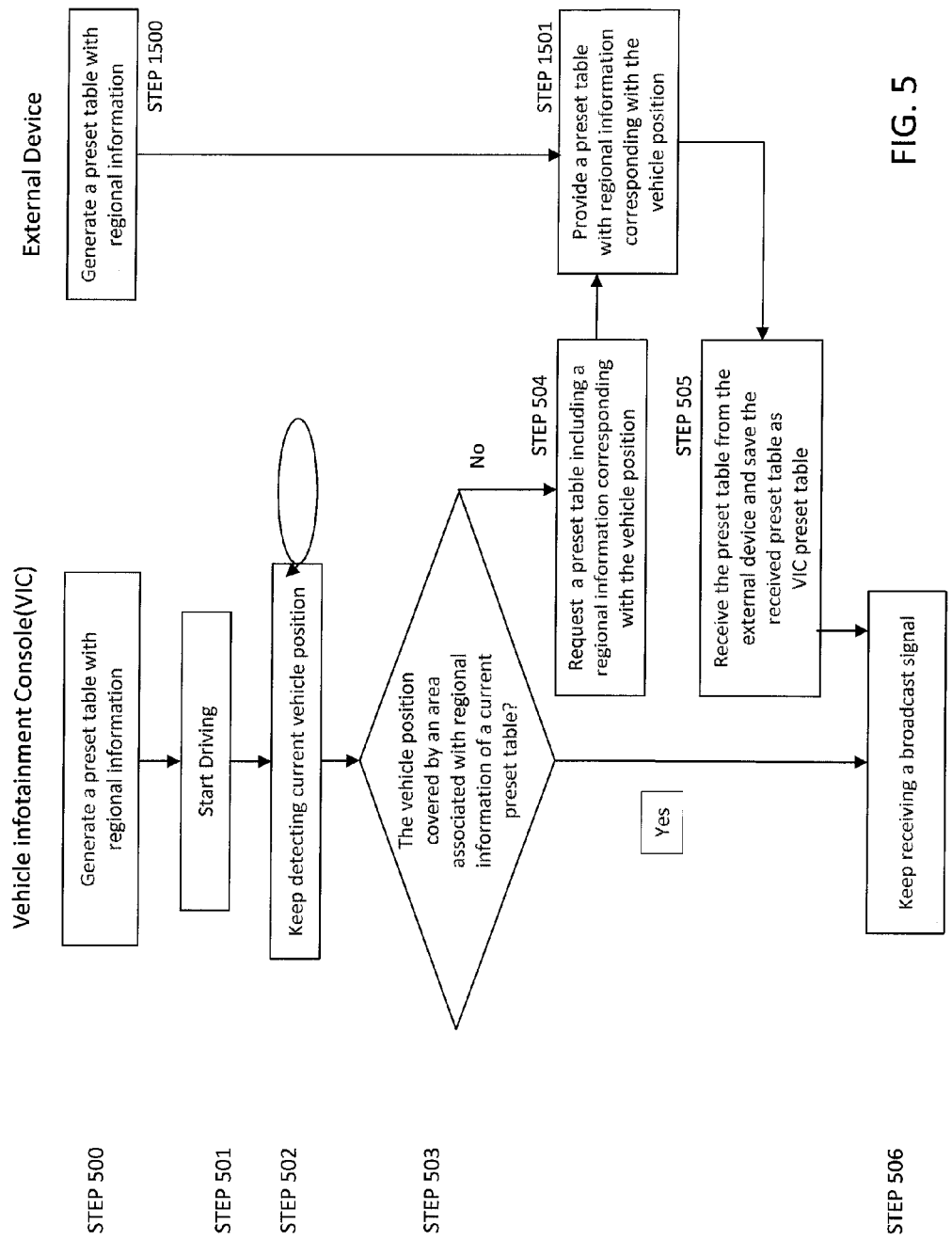
FIG. 5 is a communication flow chart of copying of a preset table in an external device to a vehicle information console, according to one embodiment.

In another embodiment, as shown in FIGS. 1 and 5, the CPU 101 of the infotainment console 100 may detect a vehicle position (Step 502), using the position/distance measuring device 109 either inside or at proximity of the infotainment console 100. For example, the position measuring device 109 may contain a vehicle speed sensor and/or odometer for detecting a moving distance, a gyroscope for detecting moving direction, a microprocessor for calculating a position, a global positioning system (GPS) received for receiving and analyzing GPS signals, etc. Thus, the position measuring device 109 may be able to calculate a current vehicle position of the vehicle containing the infotainment console 100. The CPU 101 of the infotainment console 100 may check whether the current vehicle position corresponds with the regional information in the infotainment console 100. For example, the CPU 101 may determine whether the current vehicle position is within a coverage of a broadcast area designated by the regional information in the infotainment console 100 (Step 503). When the CPU 101 determines that the current vehicle position is not within the coverage of the broadcast area designated by the regional information in the infotainment console 100, the infotainment console 100 may request a preset table from an external device (Step 504). The external device may be a smartphone 119, or any other external device accessible wired or wirelessly, if the accessible preset table contains regional information that designates an area that covers the current vehicle position. The external device, such as the smartphone 119 may provide a preset table with regional information corresponding with the vehicle position (Step 1501) upon a request from the vehicle infotainment console 100, if available. Then the CPU 101 receives the preset table from the external device and stores the received preset table as its own preset table (Step 505).

Figure 6A:
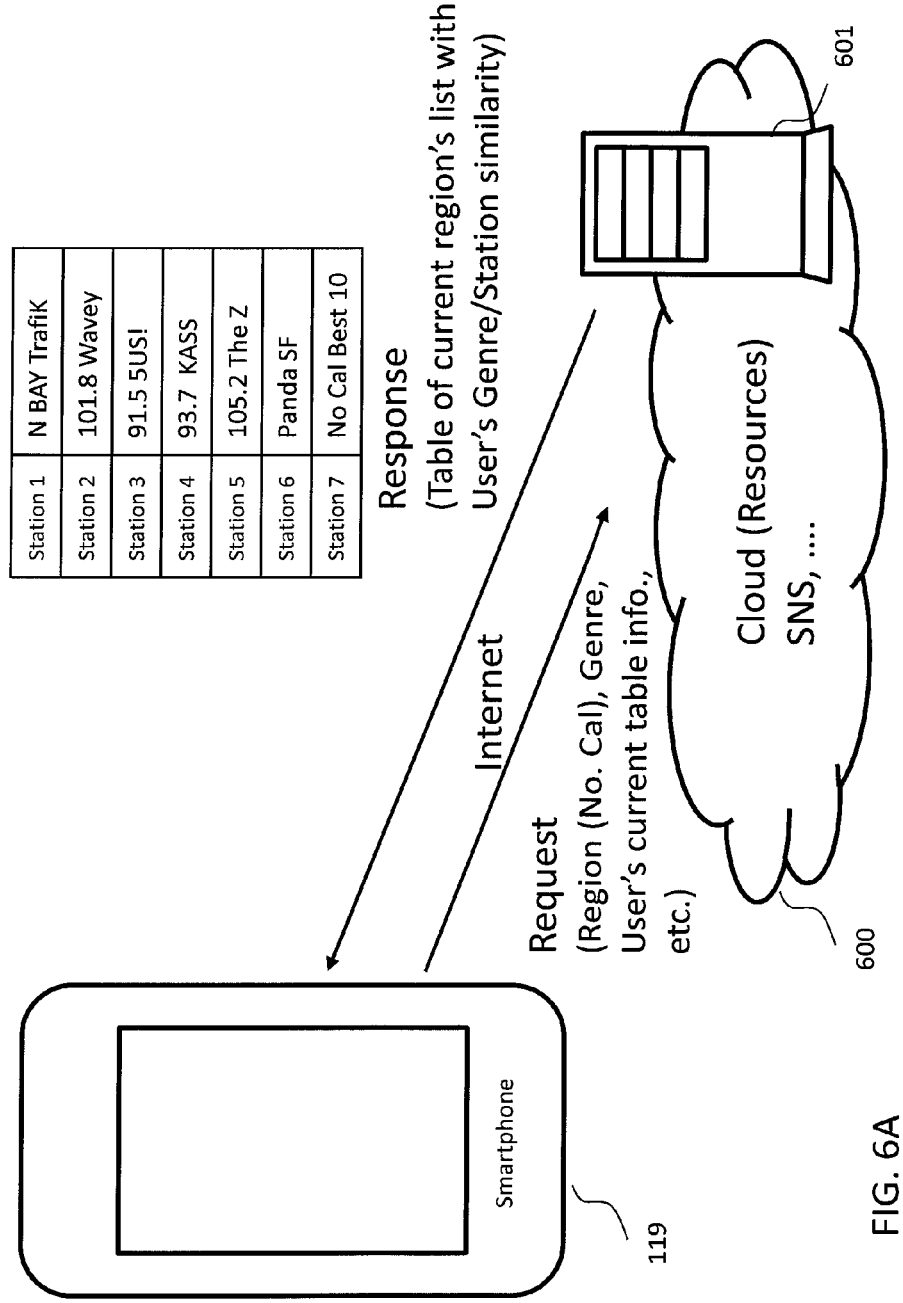
FIG. 6A is a schematic diagram of communication between a smartphone and a cloud server for sharing a preset table according to one embodiment.
Figure 6B:
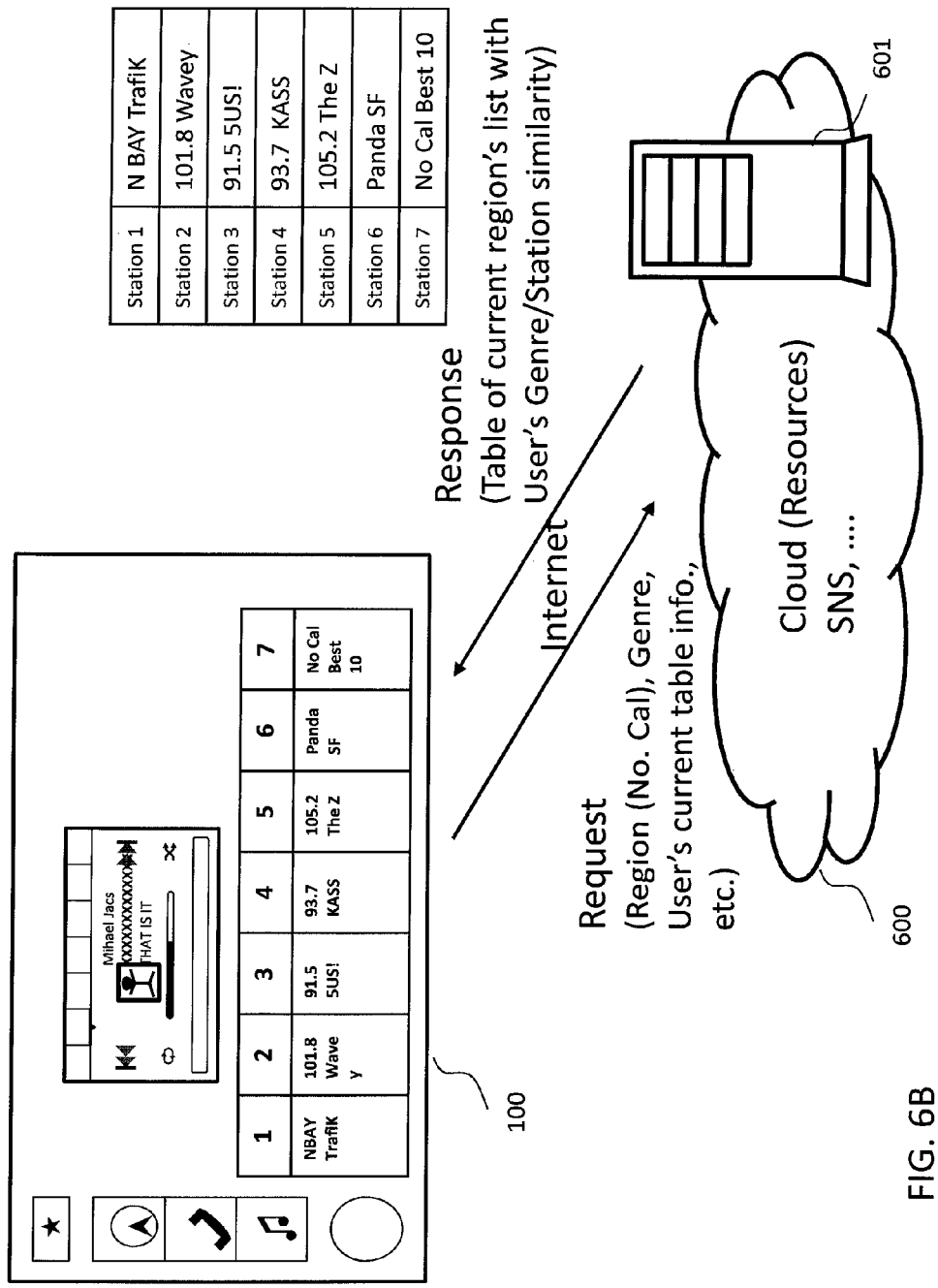
FIG. 6B is a schematic diagram of communication between a vehicle infotainment console and a cloud server for sharing a preset table according to one embodiment.

In one embodiment, for example, the external device may be a server 601, as shown in FIGS. 6A and 6B. For example, as shown in FIG. 6A, the smartphone 119 may receive such a preset table suitable for the current vehicle position, from a network 600, such as, but not limited to, a cloud type of server 601, a social networking system, etc., first. Then the infotainment console 100 may later copy the preset table suitable for the current vehicle position from the smartphone 119. Alternatively, in another embodiment, as shown in FIG. 6B, the infotainment console 100 may copy the preset table suitable for the current vehicle position directly from the network 600, such as, but not limited to, the cloud type of server 601, the social networking system, etc., if the infotainment console 100 is equipped with a bi-directional wireless communication with internet resources.

As shown in FIGS. 6A and 6B, the server 601 on the network 600 may communicate with the smartphone 119 and/or the vehicle infotainment console 100, any device that has access to the internet. The server 601 may have a portal site that allows a user to upload a user's preset table from either the smartphone 119 or the vehicle infotainment console 100. The server 601 may allow a user to download a preset table, either manually selected by the user, automatically selected by the server 601 upon region criteria, such as a suitable preset table based on the current vehicle position.

In another embodiment, when a user sets a preset table in the infotainment console 100, regional information of the preset table is determined as follows. For example, the infotainment console 100 select a current station based on the preset table in the infotainment console 100. The tuner 130 receives a broadcast signal of the current station selected from the preset table in the infotainment console 100. For example, if the received signal is in a good condition, it is possible to determine that regional information that corresponds with the current station may be applied to the preset table in the infotainment console 100. Thus, it is possible to estimate the first regional information from data on the broadcast signal, if the current station is in the first preset table. Alternatively, it may be possible to determine the regional information from a plurality of the station identification information in the preset table in the infotainment console 100 without receiving the broadcast signal.

In another embodiment, a preset table to be copied to the infotainment console 100 may be selected based on a user preference profile. Here, a user preference profile may contain several types of information of the stations in the preset table. For example, the information may be, but not limited to, genres, station information, types of contents, such as music, news, weather report, traffic, comedy, drama, documentary, etc. The information may be station's network information where the station is either a provider or an affiliate of a network, because the stations in the same network tend to broadcast a similar set of programs provided from the provider of the network.

As shown in FIGS. 6A and 6B, the server 601 on the network 600 may communicate with the smartphone 119 and/or the vehicle infotainment console 100, any device that has access to the internet. The server 601 may have a portal site that allows a user to upload a user's preset table from either the smartphone 119 or the vehicle infotainment console 100. The server 601 may allow a user to download a preset table, either manually selected by the user, automatically selected by the server 601 upon preference criteria, such as a suitable preset table based on the user's preference profile.

Figure 7:
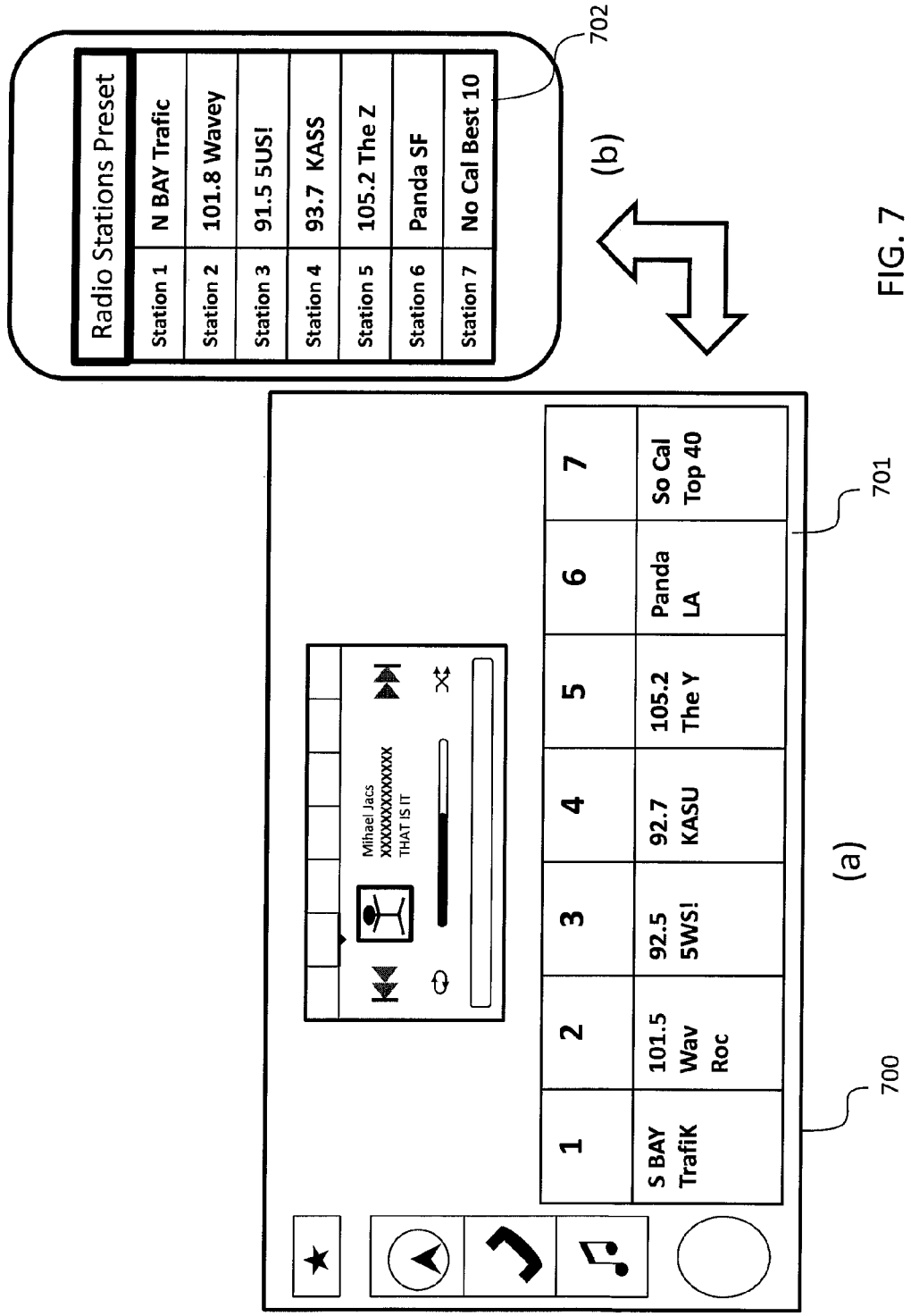
FIG. 7 shows screen examples of a shared radio station preset table across a smartphone and an infotainment console in a vehicle.

FIG. 7 shows one embodiment, when a user requests a preset table of Northern California region instead of the current preset table of the Southern California region. A preset table of the information console 701 may currently contain a station "S BAY TrafiK" which broadcasts traffic information of the Southern California region. In this case, a preset table 702 that includes "N BAY Trafic" that is a similar station that broadcasts traffic information of the Northern California region, may be chosen as a target preset table for copying. While copying, the station "N Bay Trafic" may be stored as Station 1 of the preset table of the information console 701, where the station "S BAY Trafik" was stored as the original preset table.

FIG. 7 also shows another embodiment, when a user requests a preset table of Northern California region instead of the current preset table of the Southern California region. The preset table of the information console 701 may currently contain a station "Panda LA", a Southern California region local affiliate of Panda Network. In this case, a preset table 702 that includes "Panda SF", a Northern California region local affiliate of Panda Network that is a similar station to "Panda LA" which tends to broadcast similar programs of Panda Network, may be chosen as a target preset table for copying. While copying, the station "Panda SF" may be stored as Station 6 of the preset table the information console 701, where the station "Panda LA" was stored as the original preset table.

As stated above, when the preset table of the information console 100 that contains a first preference profile including a first set of preference by a user, whether it is a genre, network, category of contents etc., and the preset table of an external device contains a second preference profile including a second set of preference, it is possible to select the second preset table based on similarity of the first preference profile and the second preference profile.

Figure 8A:
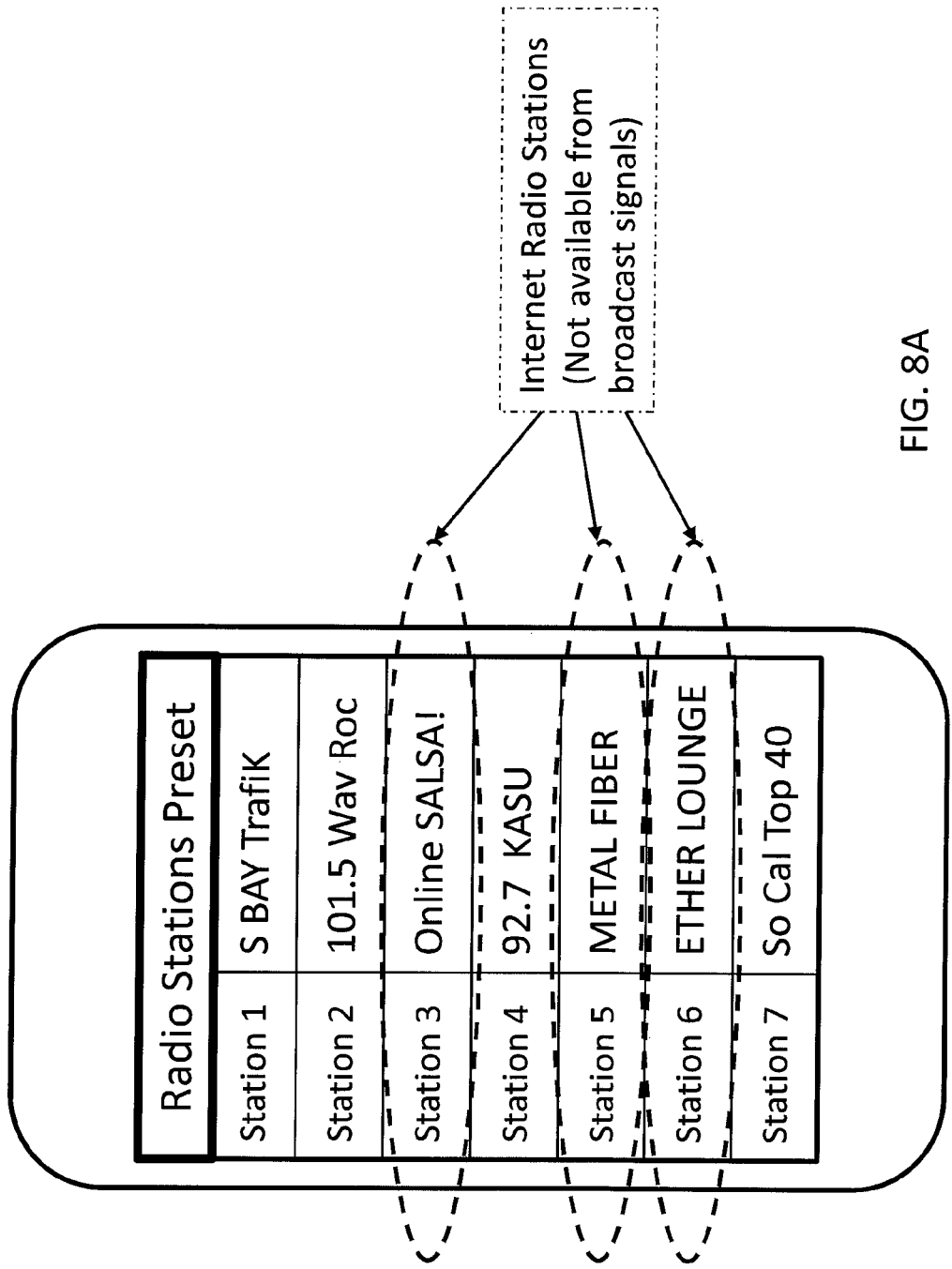
FIG. 8A shows a screen example of a shared radio station preset table of a smartphone according to another embodiment.
Figure 8B:
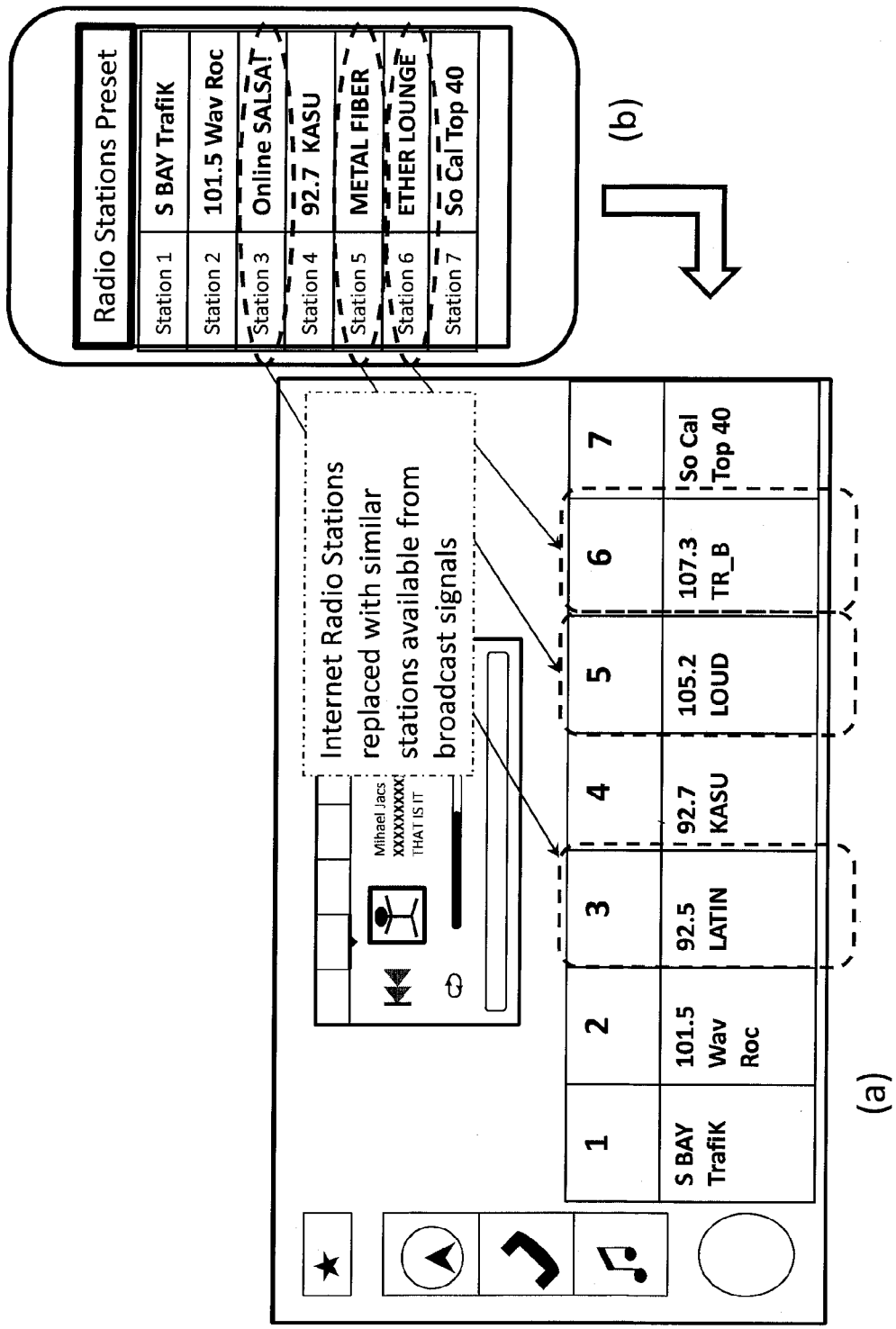
FIG. 8B shows screen examples of the shared radio station preset table across a smartphone and an infotainment console in a vehicle, according to another embodiment.

In another embodiment, a preset table in an external device may contain a station that is an internet radio station which may not be available from the tuner 130 via broadcast signals. For example, as shown in FIG. 8A, there may be a plurality of stations available as internet radio stations for a smartphone 119, but not available for the tuner 130. If this is a case, as shown in FIG. 8B, the station may simply be omitted in order to avoid user's confusion (not shown), or replaced with the similar station, if available, for the user's convenience with intuitive selection of the preset station with reasonable alternatives. This type of manipulation or modification of the preset table may be executed either by the CPU 101, or within an external device, such as the smartphone 119, either before comparison of these two preset tables for copying or after the comparison. Thus, either the CPU 101 or the smartphone 119 may determine whether the preset table in the smartphone includes the internet broadcast station identification information without its corresponding tuning frequency, and exclude the internet broadcast station identification information without its corresponding tuning frequency.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. A method of sharing a preset table between a vehicle infotainment system comprising a vehicle tuner, memory for storing a first preset table and a broadcast signal receiver configured to receive a broadcast signal based on the first preset table, and an external device configured to couple to the vehicle infotainment system, comprising:
    storing the first preset table in the memory, the first preset table comprising first regional information and at least one combination of first station identification information and a first tuning frequency corresponding to the first station identification information;
    receiving a second preset table from the external device, the second preset table comprising second regional information and at least one combination of second station identification information and a second tuning frequency corresponding to the second station identification information obtained from internet;
    comparing the first preset table with the second preset table; and
    making the first preset table and the second preset table identical, if the first preset table and the second preset table are different, by selecting the second preset table based on station's network information as to either a provider or an affiliate of a network,
    wherein the first preset table comprises a first preference profile comprising a first set of preference by a user and the second preset table comprises a second preference profile comprising a second set of preference, the method further comprising:
    selecting the second preset table based on similarity of the first preference profile and the second preference profile.

2. The method of claim 1, wherein the making the first preset table and the second preset table identical comprises copying the second preset table to the first preset table.

3. The method of claim 2, further comprising:
    storing a first time stamp indicating when the first preset table is edited;
    receiving a second time stamp indicating when the second preset table is edited; and
    comparing the first time stamp with the second time stamp;
    wherein the second preset table is copied to the first preset table, if the second time stamp is newer than the first time stamp.

4. The method of claim 2, further comprising:
    detecting a first location, which is a vehicle position, by a vehicle positioning module either inside or at proximity of the vehicle infotainment system;
    determining whether the first location is within a coverage of an area designated by the first regional information; and
    copying the second preset table to the first preset table, if it is determined that the first location is outside of the coverage of the area designated by the first regional information.

5. The method of claim 1, wherein the external device is further configured to couple to a server coupled to the internet, the method further comprising communicating the second preset table with the server.

6. The method of claim 1, further comprising:
    receiving a broadcast signal of a current station by the vehicle tuner; and
    estimating the first regional information from data on the broadcast signal, if the current station is in the first preset table.

7. The method of claim 1, further comprising:
    detecting a second location of an external device by a device positioning module either inside or at proximity of the external device,
    wherein the second regional information is associated with the second location.

8. The method of claim 1, further comprising:
    determining whether the second preset table comprises the second station identification information without its corresponding tuning frequency; and
    excluding the second station identification information without its corresponding tuning frequency.

9. A vehicle infotainment system, comprising:
    a vehicle tuner;
    a communication interface configured to couple to an external device;
    a table memory manager comprising memory and configured to store a first preset table comprising first regional information and at least one set of first station identification information and a first tuning frequency corresponding to the first station identification information;
    a broadcast signal receiver configured to receive a broadcast signal based on the first preset table;
    wherein the communication interface is configured to receive a second preset table comprising second regional information and at least one set of second station identification information and a second tuning frequency corresponding to the second station identification information obtained from internet from the external device;
    wherein the table memory manager is configured to compare the first preset table with the second preset table, and to make the first preset table and the second preset table identical, if the first preset table and the second preset table are different, by selecting the second preset table based on station's network information as to either a provider or an affiliate of a network;
    wherein the first preset table comprises a first preference profile comprising a first set of preference by a user and the second preset table comprises a second preference profile comprising a second set of preference; and
    wherein the table memory manager is configured to select the second preset table based on similarity of the first preference profile and the second preference profile.

10. The vehicle infotainment system of claim 9, wherein the table memory manager is further configured to make the first preset table and the second preset table identical by copying the received second preset table to the first preset table.

11. The vehicle infotainment system of claim 10, further comprising a vehicle positioning module either inside or at proximity of the vehicle infotainment system,
    wherein the vehicle positioning module is configured to detect a first location, which is a vehicle position, and
    wherein the table memory manager is configured to determine whether the first location is within a coverage of an area designated by the first regional information, and to copy the second preset table to the first preset table, upon determining that the first location is outside of the coverage of the area designated by the first regional information.

12. The vehicle infotainment system of claim 10, wherein the table memory manager is further configured to determine whether the second preset table comprises the second station identification information without its corresponding tuning frequency, and to exclude the second station identification information without its corresponding tuning frequency.

13. The vehicle infotainment system of claim 9,
wherein the table memory manager is further configured to store a first time stamp indicating when the first preset table is edited,
wherein the communication interface is further configured to receive a second time stamp from the external device, and
wherein the table memory manager is further configured to compare the first time stamp with the second time stamp, and to copy the second preset table to the first preset table, if the second time stamp is newer than the first time stamp.

14. The vehicle infotainment system of claim 9, wherein the communication interface is further configured to couple to a server coupled to the internet, and to communicate the second preset table with the server.

15. The vehicle infotainment system of claim 9, wherein the table memory manager is further configured to estimate the first regional information from data on the broadcast signal of a current station received at the broadcast signal receiver, if the current station is in the first preset table.

16. A non-transitory computer readable medium storing computer executable instructions for implementing a method of managing a second preset table on a device configured to couple to a vehicle infotainment system comprising a vehicle tuner and a first preset table, comprising:
allowing a user to edit the second preset table; and
transmitting the second preset table to the vehicle infotainment system for updating the first preset table in the vehicle infotainment system,
wherein the first preset table comprises first regional information and at least one combination of first station identification information and a first tuning frequency corresponding to the first station identification information and
wherein the second preset table comprises second regional information and at least one combination of second station identification information and a second tuning frequency corresponding to the second station identification information obtained from internet, and
wherein the first preset table comprises a first preference profile comprising a first set of preference by a user and the second preset table comprises a second preference profile comprising a second set of preference, the method further comprising:
receiving the first preference profile from the vehicle infotainment system; and
selecting the second preset table based on similarity of the first preference profile and the second preference profile, based on station's network information as to either a provider or an affiliate of a network.

17. The non-transitory computer readable medium of claim 16, further comprising:
receiving a command from the vehicle infotainment system,
wherein the transmitting the second preset table is executed upon a receipt of a command indicative of requesting the second preset table, if the first preset table and the second preset table are different.

18. The non-transitory computer readable medium of claim 16, the method further comprising:
storing a second time stamp indicating when the second preset table is edited, and
transmitting the second time stamp to the vehicle infotainment system.

19. The non-transitory computer readable medium of claim 16, wherein the device is further configured to couple to a server coupled to the internet, and to communicate the second preset table with the server.

20. The non-transitory computer readable medium of claim 16, the method further comprising:
detecting a second location of an external device by a device positioning module either inside or at proximity of the external device,
wherein the second regional information is associated with the second location.

21. The non-transitory computer readable medium of claim 16, further comprising:
determining whether the second preset table comprises the second station identification information without its corresponding tuning frequency; and
excluding the second station identification information without its corresponding tuning frequency.

* * * * *